United States Patent
McCaully

[15] 3,678,032
[45] July 18, 1972

[54] α,α-DIALKANOYLOXYACETYL PENICILLANIC ACID DERIVATIVES

[72] Inventor: Ronald J. McCaully, Malvern, Pa.

[73] Assignee: American Home Products Corporation, New York, N.Y.

[22] Filed: May 15, 1970

[21] Appl. No.: 37,910

[52] U.S. Cl. .......................................... 260/239.1, 424/271
[51] Int. Cl. ................................................. C07d 99/16
[58] Field of Search .............................................. 260/239.1

[56] References Cited

UNITED STATES PATENTS 3,325,477   6/1967   Fosker et al. .................. 260/239.1

*Primary Examiner*—Nicholas S. Rizzo
*Attorney*—Andrew Kafko, Joseph Martin Weigman, Dwight J. Potter, Vito Victor Bellino and Robert Wiser

[57] ABSTRACT

Novel penicillin type compounds are prepared by the α,α-dialkanoyloxyacetylation of amino substituted penicillanic acid derivatives. The compounds are useful as antibacterial agents.

3 Claims, No Drawings

α,α-DIALKANOYLOXYACETYL PENICILLANIC ACID DERIVATIVES

DESCRIPTION OF THE INVENTION

The invention is directed to compounds of the FORMULA I

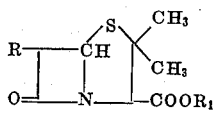

wherein R is selected from the group consisting of

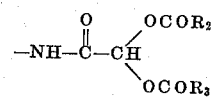

and

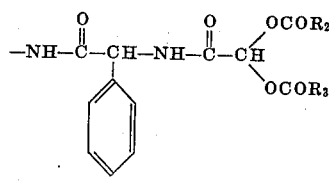

$R_1$ is selected from the group consisting of hydrogen and alkali metals; $R_2$ is selected from the group consisting of hydrogen and lower alkyl; $R_3$ is lower alkyl.

The invention also includes the hydrated and monohydrate forms of the compounds disclosed herein.

When used herein and in the appended claims, the term "(lower)alkyl" contemplated hydrocarbon radicals, straight and branched, of from about one to about six carbon atoms, illustrative members of the group being methyl, ethyl, n-propyl, i-propyl, n-butyl, t-butyl, n-pentyl, n-hexyl and the like.

Compounds of FORMULA I may be prepared by contacting an αα-dialkanoyloxyacetylhalide with an appropriate amino substituted penicillanic acid derivative according to the following reaction:

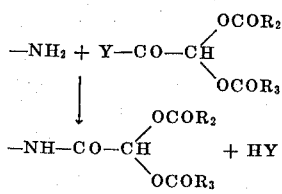

wherein Y is a displaceable group such as halogen e.g. chloro, bromo or an obvious chemical equivalent thereof and $R_2$ and $R_3$ are the same as described above. To obtain, for example, αα-diacetoxyacetyl chloride, glyoxylic acid, monohydrate (64.0 g.) and 480 ml.) (ca 520 g.) of acetic anhydride and 160 ml. of glacial acetic acid are combined and heated on a steam bath for 2 hours. The solvents are removed on a rotary evaporator and the remaining traces of acetic acid and acetic anhydride are removed by co-distillation with 100 ml. of toluene. The residue is dissolved in 350 ml. of methylene chloride and treated with 180 ml. (298 g.) of thionyl chloride. The mixture is then heated at gentle reflux for about 20 minutes and evaporated on a rotary evaporator. An additional 100 ml. of methylene chloride is added and re-evaporated to remove traces of volatile reactants. The homologs may be obtained in a similar manner.

The novel compounds of the invention are antibacterial agents useful in treating bovine mastitis and other infections amenable to therapy with penicillanic acid derivatives such as benzylpenicillin. They are also useful as growth promoters for ruminant animals such as cattle. The compounds of the invention are also useful for the inhibition of Staph. aureu, Smith at a concentration of less than 250 micrograms/ml. when applied in an aqueous vehicle.

While the invention is described in its broadest terms herein-above the following examples are added to set forth specific working embodiments of the invention.

EXAMPLE I 6-(2,2-Dihydroxyacetamido)penicillanic acid, diacetate, sodium salt To 10.81 g. of 6-aminopenicillanic acid slurried in 150 ml. of methylene chloride is added a solution of 9.75 g. of αα-diacetoxyacetyl chloride dissolved in 50 ml. of methylene chloride. The mixture is stirred at 26° C. for 2.5 hours and filtered from the undissolved solid. The filtrate is washed three times with water and then dried by passage through cotton. The yellow, oily residue that remains after evaporation of the solvent is dissolved in ethanol and allowed to stand for 12 hours. The ethanol is removed on a rotary evaporator, and the residue dissolved in ether-acetonitrile is treated with sodium 2-ethylhexanoate. The solid that separates is washed thoroughly with ether to yield the title product, m.p. 121°–125 °C. dec.

The infrared spectrum (KBr) of the product had bands at 3.00 $\mu$(NH), 5.68 $\mu$ (broad, β-lactam and ester C = O), 5.94 $\mu$ (amide (C = O), 6.14 $\mu$ and 7.29 $\mu$ (COO⊖), and 6.61 $\mu$ (amide II).

EXAMPLE II

6-[2-(2,2-Dihydroxyacetamido)-2-phenylacetamido]penicillanic acid, diacetate, dihydrate To a chilled (5°C.) solution of 5.0 g. of 6-[D(−)-α-aminophenylacetamido]penicillanic acid in 100 ml. of methylene chloride containing 3.5 g. of triethylamine is added dropwise a solution of 2.8 g. of α,α-diacetoxyacetyl chloride in 30 ml. of methylene chloride. After the addition is complete, the reaction is stirred for one hour. The methylene chloride solution is washed with 1 N hydrochloric acid and dried (MgSO₄). Evaporation of the solvent yields 4.2 g. of 6-[2-(2,2-dihydroxyacetamido)-2-phenylacetamido]penicillanic acid, diacetate, dihydrate (m.p. 78°–80°C.) as a light yellow solid.

Anal. Calcd for $C_{22}H_{25}N_3O_9S\cdot 2H_2O$: C, 48.61; H, 5.38; N, 7.73.

Found: C, 48.99; H, 4.77; N, 7.66.

The infrared spectrum (KBr) had bands at 3.09 $\mu$ (NH), 3.74-4.4 $\mu$ (acid OH), 5.65-5.78 $\mu$ (broad; β-lactam, ester, and C = O), 6.05 $\mu$ (amide C = O), and 6.6 $\mu$ (amide II).

EXAMPLE III

By an analogous procedure, the following compounds are prepared:

| $R_1$ | $R_2$ | $R_3$ |
|---|---|---|
| H | $CH_3$ | $CH_3$ |
| H | $C_2H_5$ | $C_2H_5$ |
| K | n—$C_3H_7$ | n—$C_3H_7$ |
| K | $CH_3$ | $CH_3$ |
| H | $CH_3$ | H |
| K | $CH_3$ | H |

EXAMPLE IV

By an analogous procedure, the following compounds are prepared:

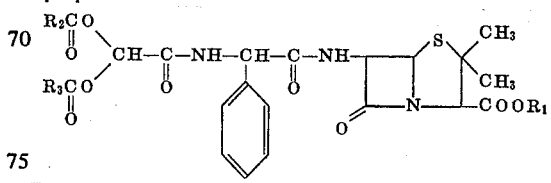

| $R_1$ | $R_2$ | $R_3$ |
|---|---|---|
| H | $CH_3$ | $CH_3$ |
| Na | $C_2H_5$ | $C_2H_5$ |
| K | n—$C_3H_7$ | n—$C_3H_7$ |
| H | $CH_3$ | H |
| K | $CH_3$ | H |

We claim:
1. A compound of the formula

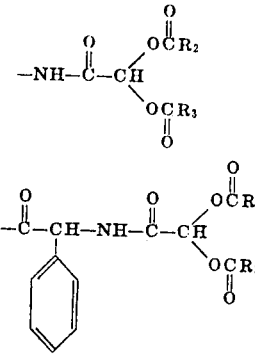

wherein R is selected from the group consisting of

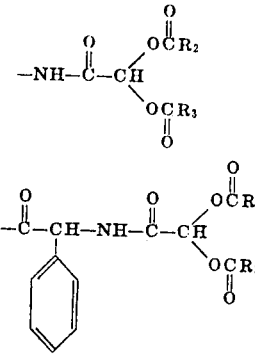

and $R_1$ is selected from the group consisting of hydrogen and alkali metals; $R_2$ is selected from the group consisting of hydrogen and (lower)alkyl; $R_3$ is (lower)alkyl.

2. A compound as defined in claim 1 which is 6-(2,2-dihydroxyacetamido)penicillanic acid, diacetate, sodium salt.

3. A compound as defined in claim 1 which is 6-[2-(2,2-dihydroxyacetamido)-2-phenylacetamido]penicillanic acid, diacetate, dihydrate.

* * * * *